US011157084B2

United States Patent
Domenikos et al.

(10) Patent No.: US 11,157,084 B2
(45) Date of Patent: *Oct. 26, 2021

(54) TOUCH ENABLING PROCESS, HAPTIC ACCESSORY, AND CORE HAPTIC ENGINE TO ENABLE CREATION AND DELIVERY OF TACTILE-ENABLED EXPERIENCES WITH VIRTUAL OBJECTS

(71) Applicant: Tactai, Inc., Waltham, MA (US)

(72) Inventors: Steven D. Domenikos, Millis, MA (US); Ilann Derche, Montreal (CA); Shyam Shankar Kamadolli, Newton, MA (US)

(73) Assignee: TACTAI, INC., Waltham, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/953,813

(22) Filed: Nov. 20, 2020

(65) Prior Publication Data

US 2021/0072829 A1 Mar. 11, 2021

Related U.S. Application Data

(63) Continuation of application No. 16/209,183, filed on Dec. 4, 2018, now Pat. No. 10,871,829.

(60) Provisional application No. 62/594,787, filed on Dec. 5, 2017.

(51) Int. Cl.
*G06F 3/01* (2006.01)
*G06F 3/041* (2006.01)
*G06F 3/0346* (2013.01)
*G06F 3/0488* (2013.01)

(52) U.S. Cl.
CPC ............ *G06F 3/016* (2013.01); *G06F 3/0346* (2013.01); *G06F 3/0416* (2013.01); *G06F 3/04886* (2013.01)

(58) Field of Classification Search
CPC ...... G06F 3/016; G06F 3/0346; G06F 3/0416; G06F 3/04886; G06F 3/04186
USPC .......................................................... 345/173
See application file for complete search history.

(56) References Cited

U.S. PATENT DOCUMENTS

| | | |
|---|---|---|
| 5,742,278 A | 4/1998 | Chen et al. |
| 6,131,097 A | 10/2000 | Peurach et al. |
| 6,275,213 B1 | 8/2001 | Tremblay et al. |
| 6,924,787 B2 | 8/2005 | Kramer et al. |
| 7,050,955 B1 | 5/2006 | Carmel et al. |
| 7,084,884 B1 | 8/2006 | Nelson et al. |
| 7,138,977 B2 | 11/2006 | Kinerk et al. |
| 7,196,688 B2 | 3/2007 | Schena |
| 7,265,750 B2 | 9/2007 | Rosenberg |
| 7,742,036 B2 | 6/2010 | Grant et al. |
| 7,755,607 B2 | 7/2010 | Poupyrev et al. |
| 7,791,588 B2 | 9/2010 | Tierling et al. |
| 8,174,372 B2 | 5/2012 | da Costa |

(Continued)

*Primary Examiner* — Abdul-Samad A Adediran
(74) *Attorney, Agent, or Firm* — Hoffman Warnick LLC

(57) ABSTRACT

Various systems, methods and computer program products are disclosed which provide tactile feedback from virtual objects. In some particular embodiments, a touch-enabled platform (TEP) is configured to: receive data indicating a user is contacting a touch interface on a device; analyze the data to determine a characteristic of the contact between the user and the touch interface; and provide a waveform to actuate vibration at the touch interface based upon the characteristic of the contact and a display characteristic at the touch interface.

18 Claims, 7 Drawing Sheets

(56) References Cited

U.S. PATENT DOCUMENTS

| | | |
|---|---|---|
| 8,352,643 B2 | 1/2013 | Birnbaum et al. |
| 8,362,882 B2 | 1/2013 | Heubel et al. |
| 8,405,612 B2 | 3/2013 | Kruse et al. |
| 8,416,066 B2 | 4/2013 | Westerinen et al. |
| 8,487,873 B2 | 7/2013 | Rosenberg |
| 8,576,253 B2 | 11/2013 | Wilson |
| 9,213,408 B2 | 12/2015 | Gandhi et al. |
| 10,725,544 B1 | 7/2020 | Taylor et al. |
| 2003/0174121 A1 | 9/2003 | Poupyrev et al. |
| 2008/0226134 A1 | 9/2008 | Stetten et al. |
| 2012/0249462 A1 | 10/2012 | Flanagan et al. |
| 2012/0299859 A1* | 11/2012 | Kinoshita ............ G06F 3/04186 345/173 |
| 2014/0104274 A1 | 4/2014 | Hilliges et al. |
| 2015/0070153 A1 | 3/2015 | Bhatia .................... G05B 15/02 340/407.1 |
| 2015/0212578 A1 | 7/2015 | Lor et al. |
| 2015/0273322 A1 | 10/2015 | Nakagawa ............ A63F 13/285 463/37 |
| 2016/0054797 A1 | 2/2016 | Tukubo |
| 2016/0105493 A1 | 4/2016 | Bacher et al. |
| 2016/0179198 A1 | 6/2016 | Levesque et al. |
| 2017/0212589 A1* | 7/2017 | Domenikos ............. G06F 3/016 |

\* cited by examiner

TOUCH ENABLING PROCESS, HAPTIC ACCESSORY, AND CORE HAPTIC ENGINE TO ENABLE CREATION AND DELIVERY OF TACTILE-ENABLED EXPERIENCES WITH VIRTUAL OBJECTS

PRIORITY CLAIM

This application is a continuation of, and claims priority to, co-pending U.S. patent application Ser. No. 16/209,183 (filed on Dec. 4, 2018), which itself claimed the benefit of U.S. Provisional Patent Application No. 62/594,787 (filed on Dec. 5, 2017), each of which is hereby incorporated by reference in its entirety.

TECHNICAL FIELD

Various aspects of the disclosure relate to virtual tactile experiences. Specific aspects are disclosed to provide a human user with tactile feedback from displayed objects in an interface (e.g., a touchscreen interface) or in an environment (e.g., an immersive environment such as virtual reality, mixed reality, merged reality, and/or augmented reality, collectively referred to as "virtual reality" (VR) herein).

BACKGROUND

The evolution of interaction paradigms from buttons, mouse-clicks, and finger swipes requires content to be accurately responsive. That is, a virtual object (e.g., in virtual reality (VR) or on a touchscreen) needs to "feel" like its natural real-world self to enable certain user experiences. For example, a wooden table or a ceramic mug should feel distinct from its surroundings and also be able to be distinguished from each other when touched by a virtual finger in VR or a real finger on an interface. However, conventional interface platforms and VR platforms fail to enable adaptive tactile feedback and integration.

SUMMARY

Various systems, methods, and computer program products are disclosed which provide a human user with tactile feedback from virtual objects, e.g., at a touch interface.

A first aspect of the disclosure includes a process whereby haptic properties are assigned to digital content (e.g., virtual objects).

A second aspect of the disclosure includes an automated process, or a manual process, to achieve the first aspect of the disclosure.

A third aspect of the disclosure includes a core haptic engine that is independent of the underlying operating system platform and user device characteristics and handles all aspects of the creation of a waveform (e.g., a dynamic, time-varying waveform) that causes complex vibration patterns to be generated at the touch interface based upon the user's exploration speed and normal force of the contact.

A fourth aspect of the disclosure includes a haptic accessory that allows delivery of real-time high fidelity haptic feedback in reaction to various events from the device on which it is installed.

In some particular cases, the display characteristic includes a depiction of an object not stored in an object library. A touch enabling platform is provided that includes an engine configured to analyze the depiction of the object and create a haptic object profile for the object.

A fifth aspect of the disclosure includes a system having: a touch interface device for receiving a haptic event from a user; and a haptic accessory coupled with the touch interface device for initiating a haptic response based upon the haptic event at the touch interface device.

A sixth aspect of the disclosure includes a system having: at least one computing device configured to: obtain raw content capable of haptic representation; convert the raw content into touch-enabled haptic content; and provide the touch-enabled haptic content to a client application.

A seventh aspect of the disclosure includes a system having: a touch interface device for receiving a haptic event from a user, the touch interface device comprising an interface and an actuator for generating a vibration, wherein the actuator is configured to initiate a haptic response based upon the haptic event at the touch interface device, wherein the haptic response is controlled by a waveform that is dynamically generated and time-varying to match an exploration profile of the haptic event as detected in real-time at the touch interface device, and wherein the exploration profile is characterized by a speed and normal force of contact by the user on the touch interface at a given time, and is unique to the user.

An eight aspect of the disclosure includes a touch-enabled platform (TEP), comprising: program code in communication with a database including a haptic object properties (HOPs) library having a haptic object profile for at least one object, wherein the TEP is configured to actuate haptic feedback at a device by performing actions comprising: receive data indicating a user is contacting a touch interface on the device; analyze the data to determine a characteristic of the contact between the user and the touch interface; and provide a waveform to actuate vibration at the touch interface based upon the characteristic of the contact and a display characteristic at the touch interface, wherein the program code is configured to provide the waveform to an actuator at the device for delivering the haptic content as a dynamic time-varying waveform in response to the user contact with the touch interface at the device, wherein the haptic content is configured to vary based on at least one of a resonance frequency of the device or a strength of an actuator at the device by at least one of: decreasing an amplitude of frequencies of the dynamic time-varying waveform that are around the resonance frequency of the device, or increasing an amplitude of frequencies of the dynamic time-varying waveform in response to detecting that that the actuator has insufficient strength to render the haptic content.

A ninth aspect of the disclosure includes a computer-implemented method of actuating haptic feedback at a device in response to detecting a haptic event from a user, the method comprising: generating a waveform for triggering a haptic response at the device; and rendering the waveform as a set of vibrations at the device, wherein the waveform comprises a series of successive vibrations that are rendered as vibrations once the haptic event is detected, and wherein each vibration is delivered as a decaying sinusoid with a frequency, amplitude and decay rate that vary based on a material of the device, wherein each vibration lasts approximately 0.10 seconds or less.

Additional particular aspects of the disclosure include one or more of the following.

In certain cases, the touch interface device includes a smartphone, a tablet, a touch-screen device, a stylus, or a keyboard.

In particular aspects, the waveform is created from an image of a physical object or an image of a derivative object.

In some implementations, the touch interface device comprises a touchscreen control panel displaying haptic-enabled icons, wherein the haptic event comprises user contact with at least one of the haptic-enabled icons.

In certain cases, the haptic response is based on haptic content associated with an element displayed on the interface, the system further comprising a filter for varying the haptic content for distinct type of actuator based on at least one of a resonance frequency of the touch interface device or a strength of the actuator.

In particular aspects, varying the haptic content comprises at least one of: decreasing an amplitude of frequencies of the dynamic time-varying waveform that are around the resonance frequency of the touch interface device, or increasing an amplitude of frequencies of the dynamic time-varying waveform in response to detecting that that the actuator has insufficient strength to render the haptic content.

In some implementations, the haptic content is varied based on a vibrational characteristic of the touch interface device.

In particular aspects, the system further includes a haptic accessory separate from the touch interface device, wherein the haptic accessory comprises the actuator for receiving the waveform and for generating the vibration based on the waveform, and wherein the haptic accessory comprises a core haptic engine (CHE) comprising: program code executed at the haptic accessory for controlling generation of the waveform; and an application programming interface (API) connected with the actuator at the haptic accessory, wherein the API is configured to render a series of waveforms at the actuator over time to match the exploration profile of a series of haptic events, and wherein the exploration profile varies over time and the dynamically generated, time-varying waveform comprises the series of waveforms.

In certain cases, each of the dynamically generated time-varying waveforms is calculated at a rate of approximately 1 kilo-hertz (kHz).

In some aspects, the calculation rate is faster than a rate at which the CHE receives data about the series of haptic events.

In particular implementations, the CHE continues calculating an amplitude of frequencies for each of the dynamically generated time-varying waveforms as data about the series of haptic events is received.

In certain aspects, the CHE accounts for delays in the data about the series of haptic events by at least one of: a) assuming constant exploration profile conditions, or b) estimating how exploration profile conditions will change over time.

In some cases, the waveform comprises a series of successive vibrations that are delivered once the haptic event is detected, and wherein each vibration is delivered as a decaying sinusoid with a frequency, amplitude and decay rate that vary based on a material of the touch interface device, wherein each vibration lasts approximately 0.10 seconds or less.

In certain implementations, the waveform is a time-varying waveform, and wherein the engine in the TEP functions in real time in response to receiving the data indicating that the user is contacting the touch interface.

In particular cases, the program code further causes vibrating the actuator at the touch device based on the waveform, wherein the actuator is internal to the device, coupled to the device, or part of a haptic accessory used with the device, wherein the device includes a smartphone, a tablet, a touch-screen device, a stylus, or a keyboard.

In certain aspects, the waveform is created from an image of a physical object or an image of a derivative object.

In particular cases, the TEP further comprises a storage system for storing the created waveform.

In certain implementations, rendering the waveform comprises rendering a series of waveforms at an actuator on the device over time to match an exploration profile of a series of haptic events, wherein the exploration profile varies over time and the series of waveforms comprises dynamically generated time-varying waveforms that are calculated at a rate of approximately 1 kilo-hertz (kHz), and wherein the series of waveforms are double integrated to create an acceleration graph representing the haptic response.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure.

Figure 1:
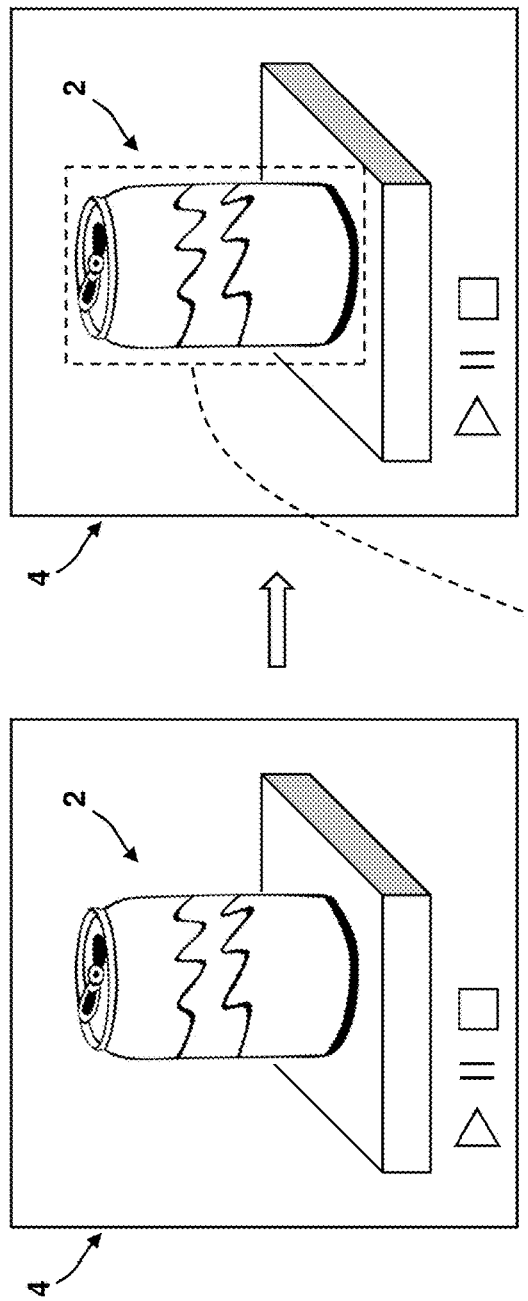
FIG. 1 shows a schematic touch enablement summary according to various embodiments of the disclosure.

It is noted that the drawings of the various aspects of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION

As noted herein, various aspects of the disclosure relate to touch-enabled platforms for virtual objects. In particular aspects, a platform enables adaptive identification and rendering of tactile feedback from virtual objects, e.g., via one or more virtual reality (VR) environments or via an interface such as a touch interface (e.g., a touchscreen, a stylus, or other touch-enabled interface).

This application incorporates each of the following by reference in its entirety: U.S. patent application Ser. No. 15/416,005, filed Jan. 26, 2017; US Provisional Patent Application No. 62/287,506, filed Jan. 27, 2016; US Provisional Patent Application No. 62/594,787, filed Dec. 5, 2017; U.S. Pat. Nos. 7,808,488; 8,988,445; Roland S. Johansson & J. Randall Flanagan, *Coding and use of tactile signals from the fingertips in object manipulation tasks*, Nature Reviews Neuroscience 10, 345-359 (May 2009); and *Vibrotactile Display: Perception, Technology, and Applica-*

*tions* by Seungmoon Choi and Katherine J. Kuchenbecker. Vol. 101, No. 9, September 2013, Proceedings of the IEEE.

Various embodiments of the disclosure include systems and methods that enable real-time application of tactile features to virtual objects, e.g., to images or other displayed objects in an adaptive manner.

In the following description, reference is made to the accompanying drawings that form a part thereof, and in which is shown by way of illustration, specific example embodiments in which the present teachings may be practiced. These embodiments are described in sufficient detail to enable those skilled in the art to practice the present teachings, and it is to be understood that other embodiments may be utilized and that changes may be made without departing from the scope of the present teachings. The following description is, therefore, merely illustrative.

Touch Enablement

The assignment of distinct surface characteristics can be accomplished manually (when content is developed from scratch as in video games or immersive VR content) much like other computer graphics and visual effects are rendered. If visual content is being created in a development environment that supports special effects, it can be fairly straightforward to add rich haptic properties by using the approaches according to embodiments disclosed herein, including using the disclosed touch enablement platform having a library of textures.

Two-dimensional (2D) and three-dimensional (3D) objects have properties such as color, shape, dimensions, shading, etc. Textures are yet another object property that may be added using the touch enablement platform disclosed according to various embodiments, for each of these content generation platforms. This is analogous to making a professional video, by adding a high-quality audio track and special effects to a movie after it has been shot with a high-fidelity camera, to produce a more compelling audio-visual experience.

For larger-scale applications of haptics, the touch enablement platform according to embodiments allows for automatic detection and identification of objects in videos and images. Using advanced artificial intelligence (AI) technology and computer vision algorithms the touch enablement platform processes videos and images to identify a large number of varied kinds of objects in each image or video frame. In example implementations, the system may be trained using an open source deep learning framework such as TensorFlow (tensorflow.org). The underlying data may be derived, for example, from the CoCo dataset (cocodataset.org). Each detected object can be endowed with corresponding haptic properties automatically. In some cases, the haptic experience may be subject to limitations of a best match with the surface contours and the closest available texture in the library. For example, the platform can detect several kinds of chairs in videos but will likely tag a chair as being wooden even if it might be plastic in reality. This can be analogous to creating amateur videos with a phone camera and uploading them to a video streaming service with the audio-visual track being limited in quality by the camera and mic on the phone; the focus is less on production values and fidelity and more on ubiquity and ease of use.

FIG. 1 shows example statistics of detecting and adding touch (haptic properties) to a soda can 2 in a video 4. The resulting video can be played in VR where users can now touch the soda can 2, grasp it, and manipulate it. This shows the potential for e-commerce, enabled by touch, of bringing a physical product closer to the user which is shown to drive engagement and to result in greater engagement with the content.

TEP—Platform Overview

The touch enabling platform (or simply, TEP) according to embodiments can be provided as a cloud service that allows a user to upload an image or video from a computer, mobile phone, tablet, or other storage device and initiate processing, and then experience the content in an application in VR or on a touch interface (e.g., a touchscreen such as on a phone, tablet, stylus, or wearable device). The TEP informs the client of embedded objects, which it is then able to render with the corresponding haptic effects automatically, as appropriate for each device. The clients and the TEP can communicate, for example, via a published secure API.

Figure 2:
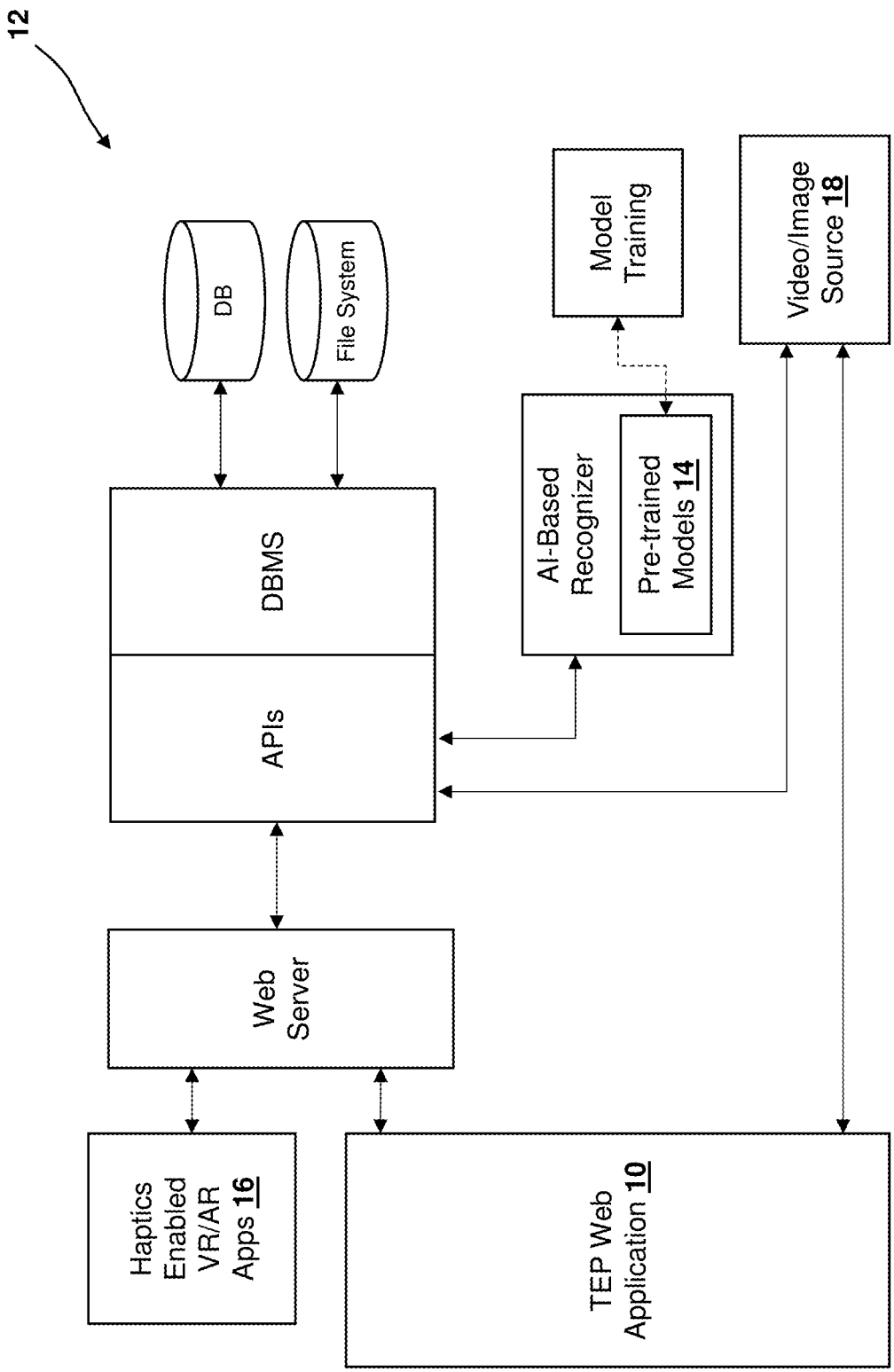
FIG. 2 shows an example data flow diagram according to various embodiments of the disclosure.

FIG. 2 illustrates system components and high-level architecture in the TEP according to embodiments. In this example, the TEP 10 is implemented via a web application. The TEP 10 can be deployed using a conventional web-based service platform 12, via standard infrastructure. However, the TEP 10 includes training models 14 which can enhance the GPU arrays in these service platforms when more computing power is needed and/or when performance scaling is required due to traffic on the server. The TEP 10 may be accessed, for example, by haptics enabled VR/AR applications 16.

According to embodiments, the TEP 10 allows for the following: the upload of photographs and videos from a video/image source 18 (e.g., a computer, mobile phone, digital camera, storage device, etc.), the detection of a large number of different categories of everyday objects in uploaded photos and videos, the tagging of detected objects with textures representing each such detected object, the browsing of videos and photos with haptic properties, API calls to fetch a list of available videos and photos, and API calls to fetch the details of haptic properties for all objects embedded in a video or photograph in a tagged format (e.g., JSON—JavaScript Object Notation).

Core Haptic Engine (CHE)

Figure 3:
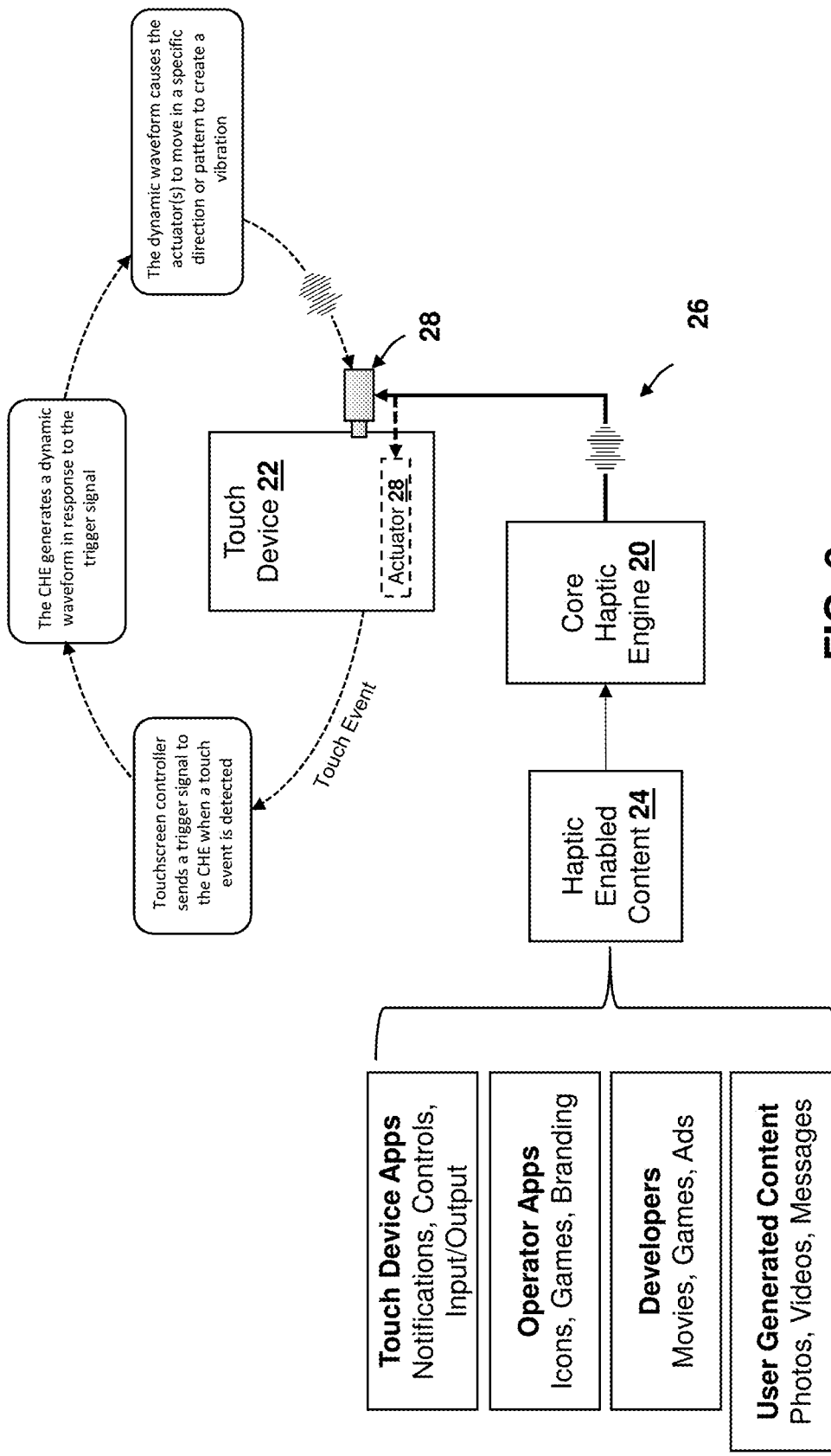
FIG. 3 shows an example data flow diagram according to various embodiments of the disclosure.
Figure 4:
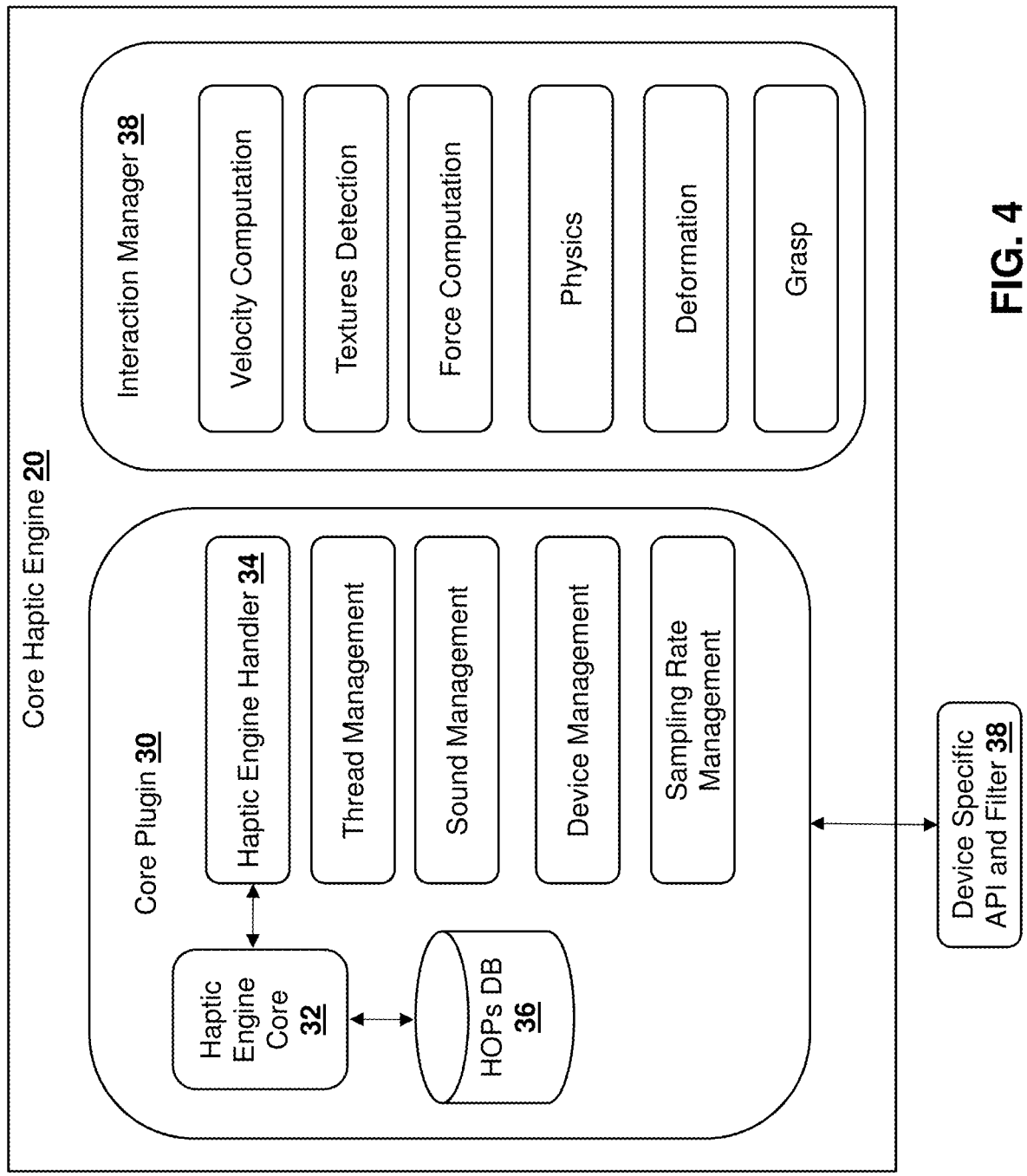
FIG. 4 is a data flow diagram illustrating relationships between a haptic plugin and core haptic engine, along with the device-specific API and filter, according to various embodiments of the disclosure.

According to embodiments, as shown in FIG. 3, a core haptic engine (CHE) 20 is provided to enable a touch interface device 22 to deliver haptic experiences (e.g., using haptic enabled content 24 generated by the TEP 10). A more detailed view of a CHE 20 is shown in FIG. 4. To this extent, the CHE 20 enables the development of engaging interactive content by enriching the experience with touch. Without limitation, haptic enabled content 24 may be provided for notifications, controls, input/output, icons, games, branding, movies, advertisements, photos, videos, messages, etc.

The CHE 20 includes a software platform configured to deliver compelling renderings or natural tactile experiences on a touch interface device 22 (e.g., mobile phone, tablet, stylus, or wearable device with touchscreen, and/or the like) using only bare finger exploration. That is, the user can experience human finger-based exploration without a dedicated custom device, by leveraging actuators (e.g., electro-mechanical elements/actuators) in and/or coupled to the touch interface device 22.

The CHE 20 is configured to dynamically generate tactile signals that match each user's exploration profile at a given instance. The CHE 20 can also include software platform enhancements to meet the unique challenges of the mobile world posed by limited screen size, single plane vibration profile, and lack of force feedback. In one example, the CHE 20 can provide haptic-enabled icons such as those in a touchscreen control panel (e.g., in the control panel or home screen of a mobile phone), where each icon feels different to the touch. Furthermore, the CHE 20 may dynamically change the haptic rendering of the icon(s) when the state of the application changes, such as when a notification is issued/received.

FIG. 4 shows an embodiment of a generalized CHE 20 for any computer operating system, which can provide one or more of the following features:

A) Flexible enough to drive the actuators (e.g. electromechanical elements/actuators) in and/or coupled with the current generation of touchscreen devices (e.g., smartphones, tablets, styluses, wearables, etc.);

B) Easily adapted to future electromechanical elements/actuators as they evolve;

C) Able to support the top smartphone designs;

D) Able to showcase haptic effects for a specific demo application: haptic-enabled icons—buttons and icons on a touchscreen that feature different texture profiles when touched;

E) Able to support addition of haptic features to enhance other system user interfaces such as icons, email, and notifications. For example, an icon could feel different to the touch when the application state changes; and F) Able to support operator branding enhancements, for example, Facebook could pay the phone vendor to make the Facebook icon feel different to touch.

The CPE 20 also provides for a consistent haptic rendering model that is independent from the underlying actuators with minimal adaptation, e.g.: enabling haptic content creation by professional developers and by consumers; supporting enhanced haptics for many system functions; and allowing a more complete haptic experience consistent across all user interface elements on a touch interface device.

The embodiment of the CHE 20 depicted in FIG. 4 includes the following subcomponents:

A) A core plugin 30 that is common across all operating systems and includes a haptic engine core 32, a haptic engine handler 34, a haptic object properties (HOPs) library 36, thread management, sound management, device management, and sampling rate management.

B) An interaction manager 38 that is operating system specific and provides for velocity computation, texture detection, force computation, physics management, deformation effects, and grasp and hand management.

C) A device-specific application programming interface (API) 38 to connect with the underlying actuating element(s) for the given environment. Through the API, the CHE 20 renders waveforms (e.g., dynamic time-varying waveforms) to create the tactile sensations.

Operational Methodology

One aspect of displaying high fidelity haptic sensations independent of a touch interface device 22 includes taking into consideration dynamic and real time data from a user's interaction with the touchscreen (or other touch-enabled element) of the touch interface device 22, such as exploration speed and normal force. These variables are then combined with the CHE's haptic models of real world materials and surfaces to generate a waveform 26 (FIG. 3) (e.g., a dynamic time-varying waveform) that carries a blend of frequencies that reflect how the user's finger is moving. The generated waveform 26 is then used to drive one or more actuators 28 in (shown in phantom) and/or coupled to the touch interface device 22 to provide haptic feedback. The Dynamic Tactile Wave™ (trademark of Tactai, Inc. of Waltham, Mass.) is an example of such a waveform.

Being able to create these dynamic waveforms 26 enables the CHE 20 to leverage effects that make it easier, for example, to distinguish borders in icons on a touch interface display. In this example, as a user's finger moves toward an icon border, the CHE 20 can fade the texture to be gentler and then the new texture to be stronger (or vice versa) to accentuate the boundary.

One challenge with bare finger exploration of a 2D surface, especially, e.g., in a mobile phone with a relatively small screen, is to localize the haptic effect. A user often holds the phone in one hand and explores the screen with the thumb of that same hand or the index finger of the other hand. In this kind of configuration, the vibration effects produced in many devices are felt in the holding hand, to the detriment of the exploring finger. Also, the finger will often touch several zones of interest at once, such as different keys of a keyboard or zones of an image and these transitions should be considered when rendering a tactile experience. Advantageously, the CHE 20 can distinguish textures of relatively small elements of the screen, as well as to affect the transition between them.

According to embodiments, the CHE 20 achieves the following example objectives:

A) The CHE 20 can render different textures for different icons, both in stationary and moving finger instances;

B) The CHE 20 can transfer transient capabilities, which allows it to render bumps, edges, and ridges to the 2D environment;

C) The CHE 20 can drive direct haptic stimulation as well as support pseudo-haptic effects that may include sound and heat, when appropriate, and visual feedback, such as object deformation when touched;

D) The CHE 20 includes a library of pseudo-haptic effects that can be selected by the user to be applied to a virtual object during tactile exploration to augment the experience and assist the brain;

E) The CHE 20 can account for the key factors that make bare finger exploration compelling and integrate those factors into the touch interfaces; and F) The CHE 20 can be used to drive the native actuators (e.g., electromechanical components) in today's touch interfaces (e.g., smartphones, wearable devices, styluses, tablets, etc.), leveraging the native haptic properties, without requiring a dedicated touch simulation device.

The CHE 20 harnesses the ability to control both amplitude and frequency of the rendered waveform 26. Where OS parameters allow for control of native device actuator(s), e.g., in both amplitude and frequency, the CHE 20 can control the duration as well as the amplitude of the vibrations. This allows for enhanced haptic stimulations. In some platforms (e.g., the Android platform), the actuator(s) are controlled through an application programming interface (API), then a native phone layer, and finally an integrated circuit. These three layers may add noise to the haptic signal, rendering it undesirable (and in some cases, ineffective). In this platform, however, the haptic stimulation can be effectively provided through the audio channel. This produces the appropriate stimulations, as measured by a vibration meter.

Rendering Ultra High-Fidelity Textures Using a Custom Smartphone Case with Embedded Actuators for Bare Finger Interaction In some example aspects, a haptic accessory is disclosed that attaches to a touch interface device (e.g., a mobile phone, tablet, stylus, touchscreen, or any touch sensitive surface) and provides real-time haptic feedback to that surface. The haptic feedback can be provided in reaction to contact with one or several objects and/or body parts such but not limited to a finger or palm. The haptic feedback can be generated in real-time and/or modulated according to interaction parameters such as the force with which each stimulating object/body part presses on the surface and the velocity at which each stimulating object/body part travels along the surface. Communication between the haptic accessory and the touch interface can occur over any available means, such as but not limited to Bluetooth, WiFi, NFC, USB 1-3, type a, b, c lightning, audio port, etc.

In some cases, a haptic accessory and touch interface can include various hardware, e.g.:

A) A haptic accessory driver with an API for integration to the touch interface device.

B) An attachment mechanism to secure the haptic accessory to the touch interface device. This can be achieved, for example, through integration of the haptic accessory into another accessory, such as, but not limited to, a protective case of a touch interface device (e.g., phone, tablet, stylus, wearable device), a USB key, permanent or temporary bonding, or self-supported (e.g., by USB or audio port connection or other wiring connection).

C) A communication circuit to establish communication with the touch interface device and transmit the haptic waveform from the touch interface device to the haptic accessory.

D) An amplifier to amplify the haptic waveform.

E) One or more actuators such as but not limited to LRA (linear resonant actuator), ERM (eccentric rotating mass), VCA (voice coil actuator), and their controllers to render the haptic feedback. The amplifier and actuator controller can be combined in a single circuit.

F) (Optionally) a power reserve such as a battery, and/or a charging port and/or a controller.

G) Additional elements to enrich the haptic experience, e.g., a heating/cooling element, speaker, lights, etc.

The haptic accessory can be either directly connected to the touch interface device or, in the case of a keyboard or any other peripherals; it can be connected to a CPU. In some cases, the haptic accessory can be integrated into the touch interface device. The haptic accessory can, for example, be either powered by the touch interface device or by another power source, e.g., on-board battery.

In some cases, the device can be configured to provide contact with the finger pad portion of a user's finger. That is, the platform can include one or more segments, or individual platforms, for contacting the finger pad portion of the finger. As used herein, the terms "fingertip," "finger pad" and "finger pad portion" can refer to one or more surfaces of the finger in the third phalange (e.g., beyond the minor knuckle), exclusive of the fingernail.

Each component of the virtual environment can be endowed with haptic object properties (HOPs) stored in the computing device, or the system can estimate appropriate HOPs from the visual appearance of a surface.

Figure 5:
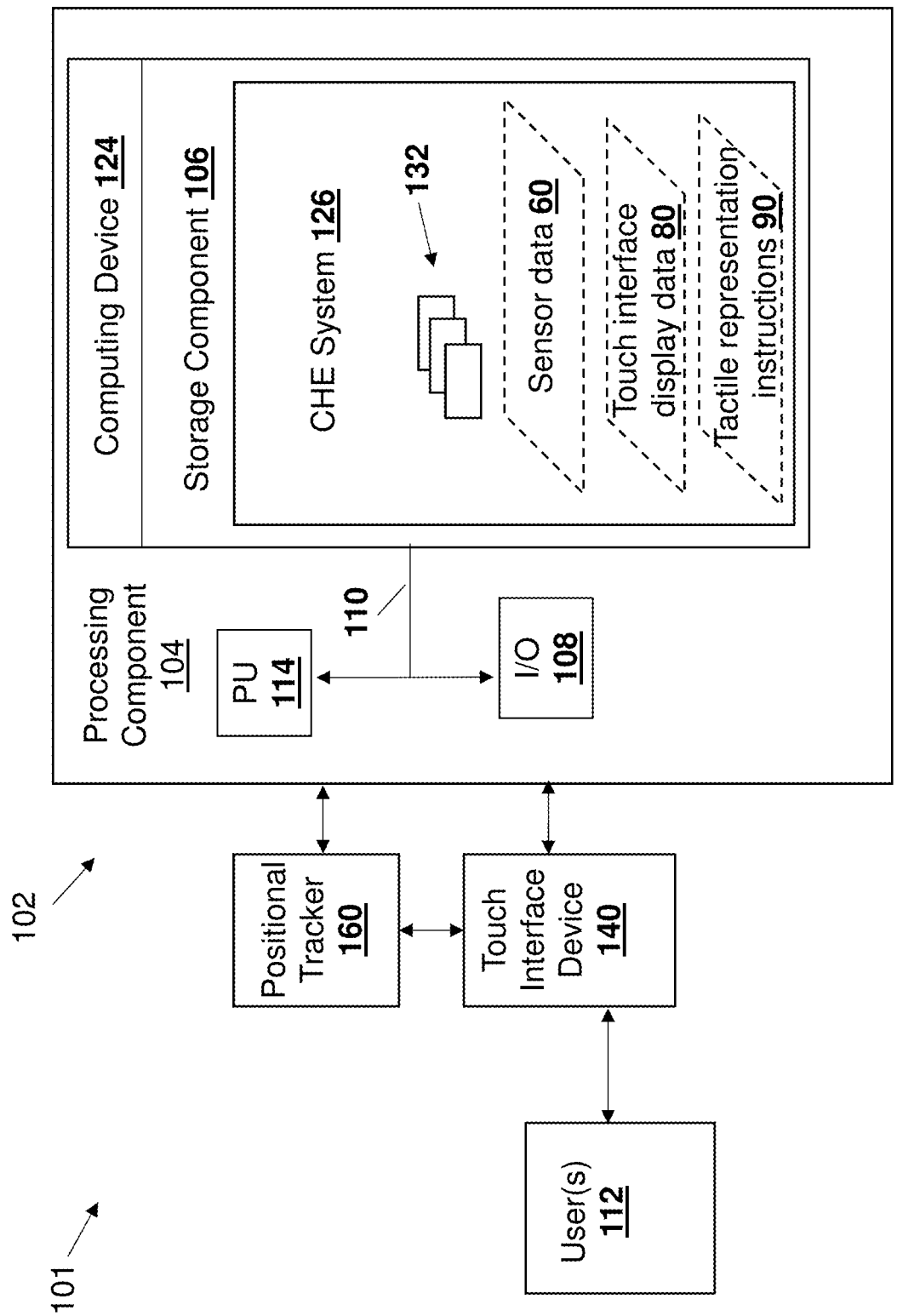
FIG. 5 shows an illustrative environment including a system according to various embodiments of the disclosure.

FIG. 5 shows an illustrative environment 101 including a CHE system 126, for performing the functions described herein according to various embodiments of the invention. To this extent, the environment 101 includes a computer system 102 that can perform one or more processes described herein in order to allow for one or more user(s) 112 to participate in touch interface functions described herein. In particular, the computer system 102 is shown as including the CHE system 126, which makes computer system 102 operable to allow for one or more user(s) 112 to participate in haptic functions by performing any/all of the processes described herein and implementing any/all of the embodiments described herein.

The computer system 102 is shown including a computing device 124, which can include a processing component 104 (e.g., one or more processors), a storage component 106 (e.g., a storage hierarchy), an input/output (I/O) component 108 (e.g., one or more I/O interfaces and/or devices), and a communications pathway 110. In general, the processing component 104 executes program code, such as the CHE system 126, which is at least partially fixed in the storage component 106. While executing program code, the processing component 104 can process data, which can result in reading and/or writing transformed data from/to the storage component 106 and/or the I/O component 108 for further processing. The pathway 110 provides a communications link between each of the components in the computer system 102. The I/O component 108 can comprise one or more human I/O devices, which enable user(s) (e.g., a human and/or computerized user) 112 to interact with the computer system 102 and/or one or more communications devices to enable the system user(s) 112 to communicate with the computer system 102 using any type of communications link. To this extent, the CHE system 126 can manage a set of interfaces (e.g., graphical user interface(s), application program interface) that enable human and/or system users(s) 112 to interact with the CHE system 126. Further, the haptic CHE system 126 can manage (e.g., store, retrieve, create, manipulate, organize, present) data, such as sensor data 60 and/or touch interface display data 80 using any solution. User 112 can interact with touch interface device 140 to experience various scenarios enabled by CHE system 126. As described herein, touch interface device 140 can include (or be coupled to) one or more sensors (e.g., magnetic, inertial, optical) and actuators (e.g., vibrational, electromagnetic, piezoelectric) for creating a tactile response to a virtual object or environment. One or more positional tracker(s) 160 can be used independently or as a complement of the on-board sensors of touch interface device(s) 140 to allow CHE system 126 to compute position and orientation of the user 112. In various embodiments, one or more positional tracker(s) 160 can be located within touch interface device(s) 140 to provide information about the position of one or more of these devices (and user 112), which may be transmitted/stored/manipulated as sensor data 60.

In any event, the computer system 102 can comprise one or more general purpose computing articles of manufacture (e.g., computing devices) capable of executing program code, such as the CHE system 126, installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, the CHE system 126 can be embodied as any combination of system software and/or application software.

It is further understood that the CHE system 126 can be implemented in a cloud-based computing environment, where one or more processes are performed at distinct computing devices (e.g., a plurality of computing devices 124), where one or more of those distinct computing devices may contain only some of the components shown and described with respect to the computing device 124 of FIG. 5.

Further, the CHE system 126 can be implemented using a set of modules 132. In this case, a module 132 can enable the computer system 102 to perform a set of tasks used by the CHE system 126, and can be separately developed and/or implemented apart from other portions of the CHE system 126. As used herein, the term "component" means any configuration of hardware, with or without software, which implements the functionality described in conjunction therewith using any solution, while the term "module" means program code that enables the computer system 102 to implement the functionality described in conjunction therewith using any solution. When fixed in a storage component 106 of a computer system 102 that includes a processing component 104, a module is a substantial portion of a component that implements the functionality. Regardless, it is understood that two or more components, modules, and/or systems may share some/all of their respective hardware and/or software. Further, it is understood that some of the functionality discussed herein may not be implemented or additional functionality may be included as part of the computer system 102.

When the computer system 102 comprises multiple computing devices, each computing device may have only a portion of CHE system 126 fixed thereon (e.g., one or more modules 132). However, it is understood that the computer system 102 and CHE system 126 are only representative of various possible equivalent computer systems that may perform a process described herein. To this extent, in other embodiments, the functionality provided by the computer system 102 and CHE system 126 can be at least partially implemented by one or more computing devices that include any combination of general- and/or specific-purpose hardware with or without program code. In each embodiment, the hardware and program code, if included, can be created using standard engineering and programming techniques, respectively.

Regardless, when the computer system 102 includes multiple computing devices 124, the computing devices can communicate over any type of communications link. Further, while performing a process described herein, the computer system 102 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

The computer system 102 can obtain or provide data, such as sensor data 60 and/or touch interface display data 80 using any solution. The computer system 102 can generate sensor data 60 and/or touch interface display data 80, from one or more data stores, receive sensor data 60 and/or touch interface display data 80, from another system, send sensor data 60 and/or touch interface display data 80 to another system, etc. As described herein, sensor data 60 can include data from one or more sensors connected with the CHE system 126, e.g., data from an interface, optical sensor, motion sensor, etc., which could indicate movement of the user's body (e.g., finger) and/or contact, compression, etc. with one or more of the sensors. Touch interface display data 80 can include information about one or more aspects of the touch interface environment, e.g., objects, spatial relationships, characteristics of the environment. These aspects can include spacing between objects (e.g., icons, renderings, etc.), softness, hardness, temperature, elasticity, etc. of objects, or physical conditions of the environment such as wetness, wind velocity, etc.

While shown and described herein as a method and system for providing a touch-enabled system, it is understood that aspects of the invention further provide various alternative embodiments. For example, in one embodiment, the invention provides a computer program fixed in at least one computer-readable medium, which when executed, enables a computer system to provide a touch-enabled system. To this extent, the computer-readable medium includes program code, such as the CHE system 126 (FIG. 5), which implements some or all of the processes and/or embodiments described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; etc.

In another embodiment, the disclosure provides a method of providing a copy of program code, such as the CHE system 126 (FIG. 5), which implements some or all of a process described herein. In this case, a computer system can process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of providing a haptic touch interface system. In this case, a computer system, such as the computer system 102 (FIG. 5), can be obtained (e.g., created, maintained, made available) and one or more components for performing a process described herein can be obtained (e.g., created, purchased, used, modified) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; etc.

In any case, the technical effect of the various embodiments of the invention, including, e.g., the CHE system 126, is to allow users to experience a haptic interaction with a touch interface as described herein.

Moreover, the CHE system 126 (FIG. 5) disclosed according to various embodiments can use pseudo-haptics with sensory feedback other than touch to supplement the haptic feedback provided to the user. Pseudo-haptics is giving a sense of physicality to virtual objects by modifying a user's perception of their body relative to the virtual object using sensory feedback other than touch (e.g., sight, sound).

In some cases, CHE system 126 is configured to initiate sounds synchronized with finger movements to supplement the information coming from the fingertip(s). CHE system 126 may be configured to initiate such sounds to make the haptic illusion more convincing. For example, CHE system 126 can send operating instructions to touch interface device 140 to initiate one or more sounds from a speaker system contained within touch interface device 140. These operating instructions can be synchronized with tactile representation instructions 90 such that sound coincides with the touch sensation experienced at the touch interface device 140.

Examples of using sound to enhance touch include, but are not limited to: sound when the fingers come in contact with an object, sound when the fingers leave contact with an object, and sounds to provide additional texture cues such as roughness or dryness. Sounds produced by the haptic interactions can also be accurately localized in space using three-dimensional mapping of the sound source (hand) and the user's ears to make the interaction more convincing. In another example, the visually depicted position and/or orientation of the user's finger in the virtual environment can be distorted so that it does not perfectly correspond to the true position of the user's finger in the real environment. Displaying the finger staying on the surface of a hard virtual object, even though the user's real finger has penetrated that space, reinforces the presented tactile feedback and helps give the user the illusion that an object is occupying that space.

Various embodiments of CHE system 126 (FIG. 5) include a software dynamic link library (DLL) to enable determining the position and orientation of the user's finger in real time.

The virtual environment can be composed of and contain a near infinite range of virtual objects. Ahead of time or when a scene is loaded, the software determines the HOPs for all surface areas of each object that can be touched by the user. This information can be stored along with the object's shape, visual appearance, and collider mesh. Each point on an object can have different HOPs, but they are generally divided into larger regions of points that are of a similar material. A given material's HOPs may include the following items:

Transient vibration and/or force responses may be produced by an actuator at the start of contact. Contact transients for interactions with real objects typically vary with the normal velocity of impact and resemble a decaying sinusoid whose frequency, amplitude, and decay rate depend on the material. Such contact transients typically last about 0.100 seconds or less. The parameters of the appropriate transient vibration and/or force response are calculated at the start of contact, based on the contacted object's properties and the contact movement, and this transient is then output by one or more actuators for the user to feel. In one instantiation, this transient is output by a vibration actuator. In another instantiation, this transient is output by an actuator responsible for translational movement.

The linear or nonlinear stiffness of the virtual object, which shows how the force, should change (typically increase) with increasing user finger penetration. This information can be stored as a mathematical function or as a discrete set of points that relate penetration to force. Typically, the force at zero penetration will be zero, but it may be nonzero.

A comprehensive texture model provides vibration and/or force responses when the finger slides along an object's surface. These vibrations generally vary with finger speed and normal force, to match how real objects feel to touch; this information can be stored in a variety of ways, such as the coefficients of a set of filters that produce suitable vibrations when driven with white noise. These vibrations are tactilely displayed to the user using one or more actuators. In one instantiation, a vibration actuator vibrates so that the user can feel the texture vibration. In another instantiation, the actuator in charge of moving the platform also outputs these vibrations. A version of the vibration waveform may also be used to modify the visual scene being displayed, e.g., by visually vibrating the finger in a similar manner.

A comprehensive friction model shows the properties of the static and/or kinetic friction present between the virtual object and the finger of the user. Static friction acts when there is no tangential relative motion between the two items, to oppose the motion that would occur in its absence, and kinetic friction acts against tangential relative motion while it is occurring. The calculated friction force may be presented to the user via one or more actuators. It may also be used to modify the visual feedback presented to the user.

The thermal conductivity of the virtual object shows how well the material conducts heat. For example, metals have high thermal conductivity, and wood generally have low thermal conductivity. As human skin is generally warmer than room temperature, contact with real objects results in heat transfer from the finger to the object. How the temperature changes over time provides a human with information about that object's properties. Thus, such a temperature profile can be calculated and tactilely displayed to the human user using one or more thermal actuators.

Transient vibration and/or force responses at the end of contact are typically smaller than the transients at the start of contact, unless the object is sticky or adhesive. They are calculated and displayed similar to the transient vibration and/or force responses played at the start of contact.

HOPs can be specified by a programmer when they are editing a virtual scene, just as the visual appearance of objects can be modified. However, users can also interact with environments that were not created with haptic feedback in mind. Thus, the system also supports an alternative method of endowing virtual objects with HOPs based on their visual properties.

In this approach, the system can estimate appropriate HOPs by analyzing the object itself, including any available characteristics, such as its visual texture, shape, size, location, and name. In one instantiation, the system matches the appearance of the virtual object or surface into a database. It finds the most likely match and uses the HOPs associated with that surface from the database. In another instantiation, the system calculates some or all of the HOPs directly from the virtual object's properties, for example creating a texture model of a rock directly from the visual texture and object size information obtained from a virtual rock. Being able to estimate with reasonable accuracy the HOPs for virtual objects that have not been explicitly labeled with HOPs is one of various distinctions between the disclosed approach and conventional approaches.

The computer sends the processor in touch interface device 140 a list of all HOP sets present in the virtual environment when the scene is first loaded. The HOP properties of new objects are sent to processor in the touch interface device 140 as they enter the scene. In one instantiation, the computer sends sets of values listed above and then later refers to these sets by index number. In another instantiation, the computer sends index numbers from a pre-existing database of HOPs, possibly with modifications to properties that differ from those in the database. The goal of this step is to make the external processor aware of the HOPs that will be used in the ensuing interaction so that the associated haptic interaction models can be readied for use. It is also possible to omit this step of sending HOPs ahead of time and simply send them with every message about contact. Furthermore, the HOPS themselves may never be transmitted to the processor in the touch interface device; instead, the dynamic tactile wave signals could be calculated on the main computer and simply output over time by the processor in the touch interface device.

When a human finger is in contact with a physical object, the finger is stopped by the physical material of the object and cannot penetrate the object. This is not the case with virtual objects, as they have no physical material. When the software system detects that the tip of the user's finger is located at a position and orientation that cause it to penetrate a virtual object, it will display the avatar's finger exactly at the surface of the object, rather than showing that the virtual finger has penetrated the object. The avatar's fingertip is shown on the surface of the object rather than inside to remain consistent with the presence of the virtual object. This visual modification of the depicted movement helps convince the user that the depicted object is physically present.

Every time new motion data is available, the system can calculate the following interaction variables for each finger, using units such as those shown in parentheses:

A) Depth of finger penetration into the surface (mm);
B) Normal speed of the finger relative to the surface (mm/s);
C) Tangential speed of the finger relative to the surface (mm/s);
D) Orientation of the finger relative to the gravity vector (unit quaternion);
E) Orientation of the surface normal being contacted (unit vector);
F) Temperature of the contact point on the object (degrees K);
G) Thermal conductivity of the material at the contact point on the object (W/(m K)); and/or
H) Which HOP set is involved in this interaction (index number).

The penetration depth value is used to signal whether contact is presently occurring; for example, 0 can indicate no contact, and positive values can indicate penetration of the finger into the object. Some range of penetration depths, such as negative values, can be used to indicate that the finger is close to coming into contact with an object. This information is useful for anticipating contact either mechanically, thermally, or computationally, so that the touch interface is ready to deliver sensations when contact does occur. If contact is not occurring, the other variables can still be used to indicate interactions with ephemeral items in the virtual object, such as wind.

These interaction variables are all sent to the processor over a connection such as USB. After receiving each new interaction packet, the processor calculates the appropriate actuation commands and sends them to the actuator(s) in use. A wide range of mappings can be used to decide how to drive the device in a given scenario.

In various embodiments, when the user's finger is contacting but not moving tangential to the virtual surface (tangential speed less than a small threshold selected to be robust to noise), no vibrations are played, as the finger is stationary on the virtual surface. And in some embodiments, when the finger is contacting and moving relative to the surface, the appropriate vibration waveform is generated and output to the device. The vibration waveform can be calculated at a rate such as 1000 Hz, which may be faster than the rate at which interaction data packets arrive. Thus, the processor may need to continue calculating the waveform for the time between data packets, assuming constant interaction conditions or estimating how those interaction conditions are changing over time. The texture vibration waveform itself can be determined according to the HOP's texture model as well as the normal force and the tangential finger velocity, described in U.S. Pat. No. 8,988,445, which is hereby incorporated by reference in its entirety. Features of the texture (vibration) actuator can include the ability to produce temperature cues, lateral movement to convey texture, and a frequency range within human fingertip sensation capabilities.

Haptic Accessory

Figure 6:
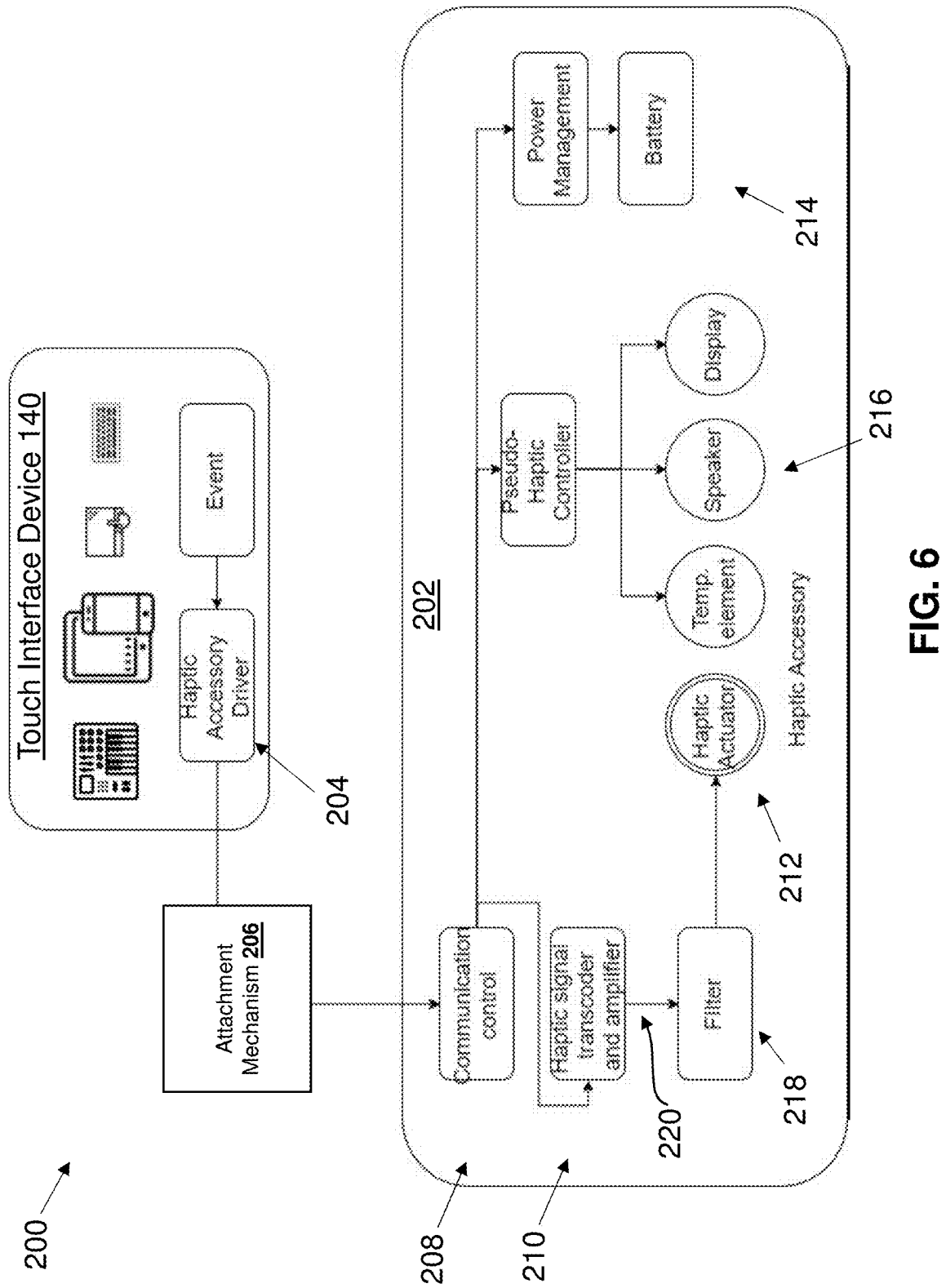
FIG. 6 shows an example environment including a touch interface device coupled with a haptic accessory for performing functions according to various embodiments of the disclosure.

FIG. 6 shows an example of an illustrative environment 200 including a touch interface device 140 coupled with a haptic accessory 202 for performing functions according to various embodiments. It is understood that this environment is one illustration of the various configurations and functions which can be performed according to the embodiments disclosed herein.

As shown, the haptic accessory 202 can be coupled with a touch interface device 140 (e.g., a mobile phone, tablet, stylus, touchscreen device, or any touch-sensitive surface). The haptic accessory 202 can provide real-time haptic feedback to that surface. The haptic feedback can be provided in reaction to contact with one or several objects and/or body parts such as but not limited to a user's finger or palm. The haptic feedback can also be triggered by an event from the touch interface device 140 to which the surface belongs, such as a notification on a phone or tablet. In some cases, the haptic feedback is generated in real time and/or modulated according to interaction parameters such as the force with which each stimulating object/body part presses on the surface, the velocity at which that object or body part travels along the surface, etc.

The haptic accessory 202 and the touch interface device 140 can be physically coupled (e.g., via conventional hardwired means), or can be wirelessly connected via any conventional means such as, but not limited to, Bluetooth, WiFi, NFC, USB 1-3, type a, b, c lightning, audio port, etc. These connection(s) can provide for one-way or two-way communication between the haptic accessory 202 and the touch interface device 140.

In some particular embodiments, as shown in the example depiction in FIG. 6, the system including the touch interface device 140 and the haptic accessory 202 can include a haptic accessory driver 204 (e.g., with an API) for integration of the haptic accessory 202 with the touch interface device 140. The system can further include an attachment mechanism 206 to secure the haptic accessory 202 to the touch interface device 140. This can be achieved, for example, through integration of the haptic accessory 202 within another accessory, such as, but not limited to, a protective case (e.g., in the protective case of a phone or tablet), a USB key, etc. The attachment mechanism 206 may additionally, or alternatively, include a permanent or temporary bond, or be self-supported by a connection method such as a USB port, USB key, etc.

A communication system 208 may be provided to establish communication with the touch interface device 140, and transmit the haptic waveform from the touch interface device 140 to the haptic accessory 202. Additionally, an amplifier 210 may be included to amplify the haptic waveform. One or more actuators 212, such as, but not limited to, LRA, ERM, or VCA, and their controllers, may be provided to render the haptic feedback. A power reserve 214 (e.g., battery), a charging port, and/or a controller may also be included in the haptic accessory 202. Other components 216, such as heating/cooling elements, speaker(s), lighting, etc., may also be included in the haptic accessory 202 to provide pseudo-haptic effects.

In particular embodiments, the haptic accessory 202 can be directly connected to the touch interface device 140, however, in other cases, (e.g., where the touch interface device 140 includes a keyboard or other peripheral components, the haptic accessory 202 can be connected with a CPU or other processor. In some example embodiments, the haptic accessory 202 can be either powered by the touch interface device 140, or by an on-board battery or other power source (e.g., RFID or other near-wave communication power source).

Operational Methodology

As a response to a stimulation, whether finger/stylus contact with the surface (e.g., touch interface device 140 surface) or internal device vent, a dynamic waveform 26 (FIG. 3) is generated in real-time by the haptic plugin 30 (FIG. 4) and sent to the haptic accessory 202 through a communication port. The haptic accessory 202 renders the different modalities of the waveform 26 (e.g., vibration, temperature, sound, etc.). In some cases, to properly render the vibratory modalities of the waveform 26, the haptic accessory 202 has a response curve as neutral or flat as possible. Depending, e.g., on its material composition and spatial distribution of its components, the haptic accessory 202 will have has a specific response to vibrations. In various embodiments, to get closer to a flat response curve, a filter 218 may be applied to the waveform 220 being sent to the haptic actuator 212. The filter 218 can decrease the amplitude of frequencies that are around the resonance frequency of the system, and increase the amplitude of frequencies where the haptic actuator 212 is weaker.

Figure 7:
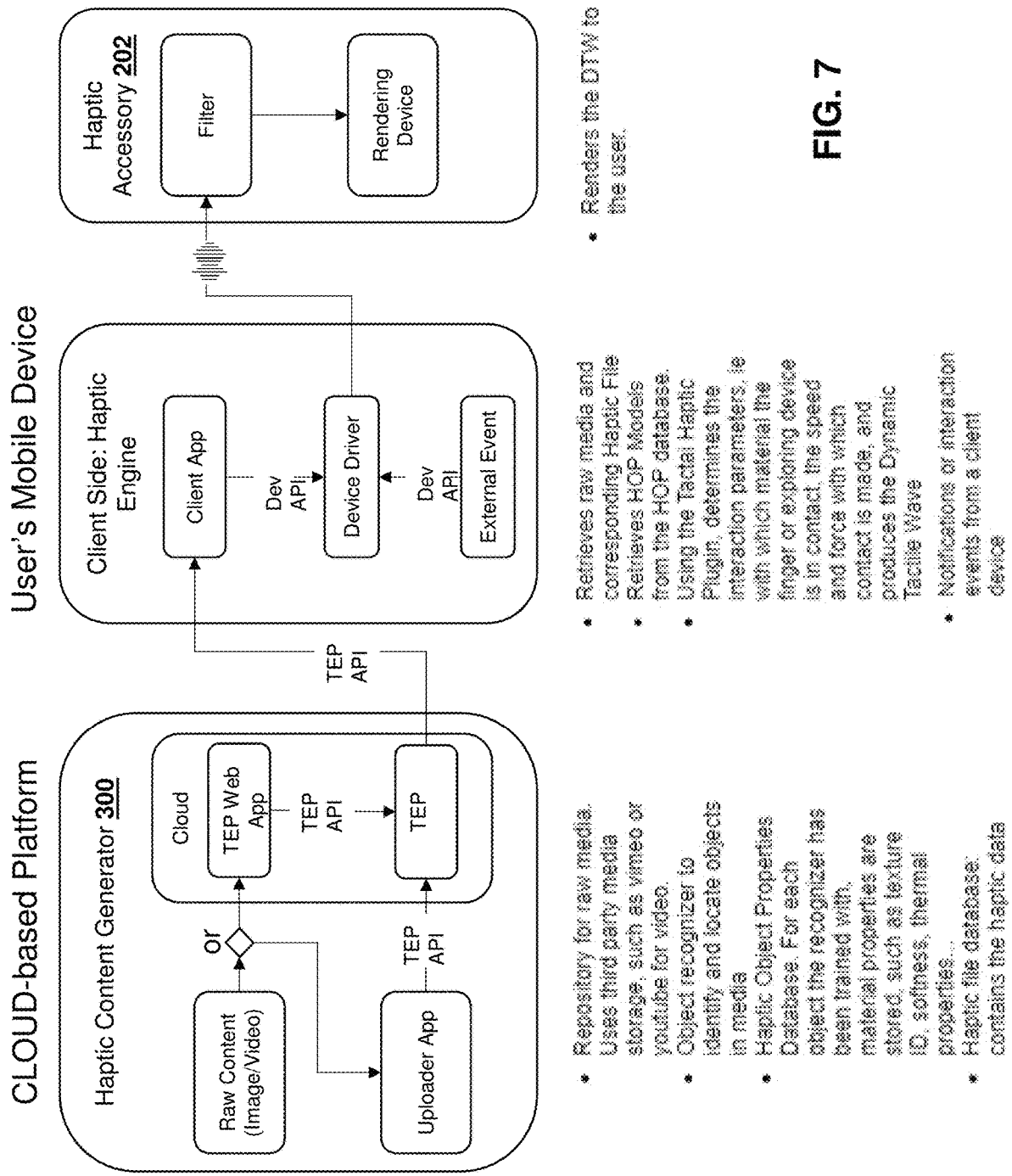
FIG. 7 is a data flow diagram illustrating processes in approaches for haptic content generation and delivery according to various embodiments of the disclosure.

FIG. 7 is a data flow diagram illustrating processes in approaches for haptic content generation and delivery according to various embodiments. As shown, the haptic content generator 300 can use raw content (e.g., still frame images or video) and convert that content (using the TEP platform) into haptic content for use at a client application. This haptic content can be rendered (delivered) at a device such as a touch interface device (e.g., touch interface device 140 (FIGS. 5 and 6) and/or a haptic accessory 202 (FIG. 6).

In the description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Illustrations with respect to one or more embodiments, alterations and/or modifications can be made to the illustrated examples without departing from the spirit and scope of the appended claims. In addition, while a particular feature may have been disclosed with respect to only one of several embodiments, such feature may be combined with one or more other features of the other embodiments as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Notwithstanding that the numerical ranges and parameters setting forth the broad scope of embodiments are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

As used herein, the term "configured," "configured to" and/or "configured for" can refer to specific-purpose features of the component so described. For example, a system or device configured to perform a function can include a computer system or computing device programmed or otherwise modified to perform that specific function. In other cases, program code stored on a computer-readable medium (e.g., storage medium), can be configured to cause at least one computing device to perform functions when that program code is executed on that computing device. In these cases, the arrangement of the program code triggers specific functions in the computing device upon execution. In other examples, a device configured to interact with and/or act upon other components can be specifically shaped and/or designed to effectively interact with and/or act upon those components. In some such circumstances, the device is configured to interact with another component because at least a portion of its shape complements at least a portion of the shape of that other component. In some circumstances, at least a portion of the device is sized to interact with at least a portion of that other component. The physical relationship (e.g., complementary, size-coincident, etc.) between the device and the other component can aid in performing a function, for example, displacement of one or more of the device or other components, engagement of one or more of the device or other component, etc.

In various embodiments, components described as being "coupled" to one another can be joined along one or more interfaces. In some embodiments, these interfaces can include junctions between distinct components, and in other cases, these interfaces can include a solidly and/or integrally formed interconnection. That is, in some cases, components that are "coupled" to one another can be simultaneously formed to define a single continuous member. However, in other embodiments, these coupled components can be formed as separate members and be subsequently joined through known processes (e.g., soldering, fastening, ultrasonic welding, bonding). In various embodiments, electronic components described as being "coupled" can be linked via conventional hard-wired and/or wireless means such that these electronic components can communicate data with one another.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

We claim:

1. A system comprising: a touch interface device for receiving a haptic event from a user, the touch interface device comprising a touch interface and an actuator for generating a vibration, wherein the actuator is configured to initiate a haptic response based upon the haptic event at the touch interface device, wherein the haptic response is controlled by a waveform that is dynamically generated and time-varying to match an exploration profile of the haptic event as detected in real-time at the touch interface device, and wherein the exploration profile is characterized by a speed and normal force of contact by the user on the touch interface at a given time, and is unique to the user; and a haptic accessory physically separate from the touch interface device, wherein the haptic accessory comprises the actuator for receiving the waveform and for generating the vibration based on the waveform, and wherein the haptic accessory comprises a core haptic engine (CHE) comprising:

program code executed at the haptic accessory for controlling generation of the waveform; and an application programming interface (API) connected with the actuator at the haptic accessory, wherein the API is configured to render a series of waveforms at the actuator over time to match the exploration profile including the speed and the normal force of contact by the user on the touch interface of a series of haptic events, and wherein the exploration profile varies over time and the dynamically generated, time-varying waveform comprises the series of waveforms.

2. The system of claim 1, wherein the touch interface device includes a smartphone, a tablet, a touch-screen device, a stylus, or a keyboard.

3. The system of claim 1, wherein the waveform is created from an image of a physical object or an image of a derivative object.

4. The system of claim 1, wherein the touch interface device comprises a touchscreen control panel displaying haptic-enabled icons, wherein the haptic event comprises user contact with at least one of the haptic-enabled icons.

5. The system of claim 1, wherein the haptic response is based on haptic content associated with an element displayed on the interface, the system further comprising a filter for varying the haptic content for distinct type of actuator based on at least one of a resonance frequency of the touch interface device or a strength of the actuator.

6. The system of claim 5, wherein varying the haptic content comprises at least one of:

decreasing an amplitude of frequencies of the dynamic time-varying waveform that are around the resonance frequency of the touch interface device, or increasing an amplitude of frequencies of the dynamic time-varying waveform in response to detecting that the actuator has insufficient strength to render the haptic content.

7. The system of claim 5, wherein the haptic content is varied based on a vibrational characteristic of the touch interface device.

8. The system of claim 1, wherein each of the dynamically generated time-varying waveforms is calculated at a rate of approximately 1 kilo-hertz (kHz).

9. The system of claim 8, wherein the calculation rate is faster than a rate at which the CHE receives data about the series of haptic events.

10. The system of claim 9, wherein the CHE continues calculating an amplitude of frequencies for each of the dynamically generated time-varying waveforms as data about the series of haptic events is received.

11. The system of claim 10, wherein the CHE accounts for delays in the data about the series of haptic events by at least one of:

a) assuming constant exploration profile conditions, or b) estimating how exploration profile conditions will change over time.

12. The system of claim 1, wherein the waveform comprises a series of successive vibrations that are delivered once the haptic event is detected, and wherein each vibration is delivered as a decaying sinusoid with a frequency, amplitude and decay rate that vary based on a material of the touch interface device, wherein each vibration lasts approximately 0.10 seconds or less.

13. A touch-enabled platform (TEP), comprising:

program code in communication with a database including a haptic object properties (HOPs) library having a haptic object profile for at least one object, wherein the TEP is configured to actuate haptic feedback at a device by performing actions comprising:

receive data indicating a user is contacting a touch interface on the device;

analyze the data to determine a characteristic of the contact between the user and the touch interface; and provide a waveform to actuate vibration at the touch interface based upon the characteristic of the contact and a display characteristic at the touch interface, wherein the program code is configured to provide the waveform to an actuator at the device for delivering the haptic content as a dynamic time-varying waveform in response to the user contact with the touch interface at the device, wherein the haptic content is configured to vary based on at least one of a resonance frequency of the device or a strength of the actuator at the device by at least one of:

decreasing an amplitude of frequencies of the dynamic time-varying waveform that are around the resonance frequency of the device, or increasing an amplitude of frequencies of the dynamic time-varying waveform in response to detecting that that the actuator has insufficient strength to render the haptic content.

14. The TEP of claim 13, wherein the waveform is a time-varying waveform, and wherein the engine in the TEP functions in real time in response to receiving the data indicating that the user is contacting the touch interface.

15. The TEP of claim 13, wherein the program code further causes: vibrating the actuator at the touch device based on the waveform, wherein the actuator is internal to the device, coupled to the device, or part of a haptic accessory used with the device, wherein the device includes a smartphone, a tablet, a touch-screen device, a stylus, or a keyboard.

16. The TEP of claim 13, wherein the waveform is created from an image of a physical object or an image of a derivative object.

17. The TEP of claim 16, further comprising a storage system for storing the created waveform.

18. A computer-implemented method of actuating haptic feedback at a device in response to detecting a haptic event from a user, the method comprising:

generating a waveform for triggering a haptic response at the device; and rendering the waveform as a set of vibrations at the device, wherein the waveform comprises a series of successive vibrations that are rendered as vibrations once the haptic event is detected, and wherein each vibration is delivered as a decaying sinusoid with a frequency, amplitude and decay rate that vary based on a material of the device, wherein each vibration lasts approximately 0.10 seconds or less, wherein rendering the waveform comprises rendering a series of waveforms at an actuator on the device over time to match an exploration profile of a series of haptic events, wherein the exploration profile varies over time and the series of waveforms comprises dynamically generated time-varying waveforms that are calculated at a rate of approximately 1 kilo-hertz (kHz), and wherein the series of waveforms are double integrated to create an acceleration graph representing the haptic response.

* * * * *